(12) United States Patent
Courchesne et al.

(10) Patent No.: US 8,238,677 B2
(45) Date of Patent: Aug. 7, 2012

(54) ADAPTIVE LOSSLESS DATA COMPRESSION METHOD FOR COMPRESSION OF COLOR IMAGE DATA

(75) Inventors: Adam J. Courchesne, Belchertown, MA (US); Francis A. Kampf, Jeffersonville, VT (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 12/044,297

(22) Filed: Mar. 7, 2008

(65) Prior Publication Data
US 2009/0226084 A1 Sep. 10, 2009

(51) Int. Cl.
*G06K 9/00* (2006.01)
*G06K 9/36* (2006.01)
*G06K 9/46* (2006.01)

(52) U.S. Cl. ........ 382/239; 382/162; 382/166; 382/232; 382/244

(58) Field of Classification Search .................. 382/162, 382/166, 232, 239, 244
See application file for complete search history.

(56) References Cited

U.S. PATENT DOCUMENTS

| | | | |
|---|---|---|---|
| 5,142,272 A * | 8/1992 | Kondo | 345/550 |
| 5,260,693 A | 11/1993 | Horsley | |
| 5,363,098 A | 11/1994 | Antoshenkov | |
| 5,530,661 A * | 6/1996 | Garbe et al. | 708/420 |
| 5,748,768 A | 5/1998 | Sivers et al. | |
| 5,748,786 A | 5/1998 | Zandi et al. | |
| 5,771,010 A | 6/1998 | Masenas | |
| 5,874,907 A | 2/1999 | Craft | |
| 5,874,908 A | 2/1999 | Craft | |
| 5,877,711 A | 3/1999 | Craft | |
| 5,974,179 A | 10/1999 | Caklovic | |
| 6,008,743 A | 12/1999 | Jaquette | |
| 6,271,775 B1 | 8/2001 | Jaquette et al. | |
| 6,281,816 B1 | 8/2001 | Kampf | |
| 6,300,885 B1 | 10/2001 | Davenport et al. | |
| 6,556,209 B2 * | 4/2003 | Kondo | 345/550 |
| 6,657,565 B2 | 12/2003 | Kampf | |
| 6,668,090 B1 | 12/2003 | Joshi et al. | |
| 6,759,300 B2 | 7/2004 | Lay et al. | |
| 6,778,109 B1 | 8/2004 | Chu | |
| 6,816,093 B1 | 11/2004 | Jaquette | |
| 6,816,280 B1 | 11/2004 | Davenport et al. | |

(Continued)

FOREIGN PATENT DOCUMENTS

JP 2000-078020 A 3/2000

OTHER PUBLICATIONS

T. Boutell, et al., "PNG (Portable Network Graphics) Specification; Version 1.0," Network Working Group; RFC 2083; Information; pp. 1-102; Mar. 1997.

*Primary Examiner* — Bernard Krasnic
(74) *Attorney, Agent, or Firm* — Cantor Colburn LLP; Michael LeStrange

(57) ABSTRACT

An adaptive lossless data compression method for compression of color image data in a data processing system. The method includes comparing a plurality of components of a plurality of adjacent pixels in a digital image, calculating spatial differences between the plurality of adjacent pixels, encoding the spatial differences and recording the encoded spatial differences, formatting an image file representing the digital image into byte streams based on bit significance, and compressing, independently, the byte streams associated with each bit significance of the encoded spatial differences.

12 Claims, 5 Drawing Sheets

U.S. PATENT DOCUMENTS

| | | |
|---|---|---|
| 6,944,333 B2 | 9/2005 | Douglass |
| 7,003,111 B2 | 2/2006 | Jaquette |
| 7,050,645 B2 * | 5/2006 | Sato et al. .................. 382/250 |
| 7,051,126 B1 | 5/2006 | Franklin |
| 7,162,077 B2 | 1/2007 | Li |
| 7,164,369 B2 | 1/2007 | Gaebel et al. |
| 7,188,130 B2 | 3/2007 | Luick |
| 7,352,298 B2 | 4/2008 | Monro |
| 7,436,999 B2 | 10/2008 | Ohmi et al. |
| 2001/0003544 A1 * | 6/2001 | Kajiwara et al. .............. 382/240 |

* cited by examiner

30

ARRAY
| INDEX: | 0 | 1 | 2 | 3 | 4 | 5 | 6 ... |
|---|---|---|---|---|---|---|---|
| VALUE: | A | A-1 | A+1 | A-2 | A+2 | A-3 | A+3 |

ARRAY0
| INDEX: | 0 | 1 | 2 | 3 | 4 | ..... | 254 | 255 |
|---|---|---|---|---|---|---|---|---|
| VALUE: | 0 | 1 | 2 | 3 | 4 | ..... | 254 | 255 |

ARRAY255
| INDEX: | 0 | 1 | 2 | ..... | 253 | 254 | 255 |
|---|---|---|---|---|---|---|---|
| VALUE: | 255 | 254 | 253 | ..... | 2 | 1 | 0 |

ARRAY6
| INDEX: | 0 | 1 | 2 | 3 | 4 | 5 | ..... | 254 | 255 |
|---|---|---|---|---|---|---|---|---|---|
| VALUE: | 6 | 5 | 7 | 4 | 8 | 3 | ..... | 254 | 255 |

FIG. 4

ADAPTIVE LOSSLESS DATA COMPRESSION METHOD FOR COMPRESSION OF COLOR IMAGE DATA

BACKGROUND OF THE INVENTION

1. Field of the Invention

This invention relates generally to compressing color image data in a data processing system. Specifically, the present invention relates to a method for improving adaptive lossless data compression (ALDC) compression of color image data.

2. Description of Background

Currently, the ALDC compression algorithm is used in many data processing systems due to its data transmission speed and ability to handle any form of data. ALDC or LZ-1 is a compression algorithm that compresses the data by encoding repetitive strings of characters or bytes of data. Lossless compression algorithm means that no data is lost during the compression and decompression process. For example, when the ALDC compression algorithm is used in a printing device connected to a host computer via a communication link, for example, when ASCII, such as postscript files are sent to the printing device, the ALDC compression algorithm performs to maximize the performance of the communication link to the host computer. However, images embedded in documents to be printed may pose a problem in that raw image data (i.e., raw data bytes) typically has a high level of entropy and tends to compress in ALDC at a data expansion rate of up to approximately 12.5%. Thus, if the data has been encoded in one of many existing image compression algorithms, such as JPEG, JBIG, GIF or TIFF, for example, then the data has to be decompressed prior to transmission to the printing device. Further, the printing device is required to maintain input buffers at a level that will not interrupt printing.

SUMMARY OF THE INVENTION

The shortcomings of the prior art are overcome and additional advantages are provided through the provision of an adaptive lossless data compression method for compression of color image data in a data processing system. The method includes comparing a plurality of adjacent pixels in a digital image, calculating spatial differences between the plurality of adjacent pixels, encoding the spatial differences, recording the encoded spatial differences, formatting an image file representing the digital image into byte streams based on bit significance, and compressing, independently, the byte streams associated with each bit significance of the encoded spatial differences.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

Embodiments of the present invention create a method of compressing color image data by first reducing entropy through a difference calculation and encoding. The resultant encoded difference data has lower entropy then the original raw image data and thereby results in a higher compression ratio.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is a chart illustrating encoding arrays that can be implemented within embodiments of the present invention.

DETAILED DESCRIPTION OF THE INVENTION

Figure 1:
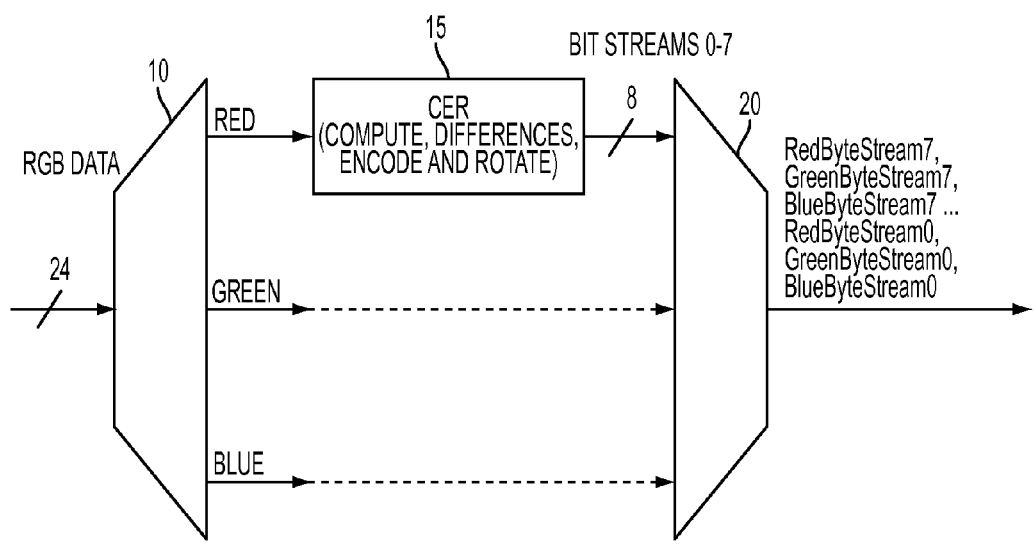
FIG. 1 is a schematic diagram for explaining preprocessing of color image data that can be implemented within embodiments of the present invention.
Figure 2:
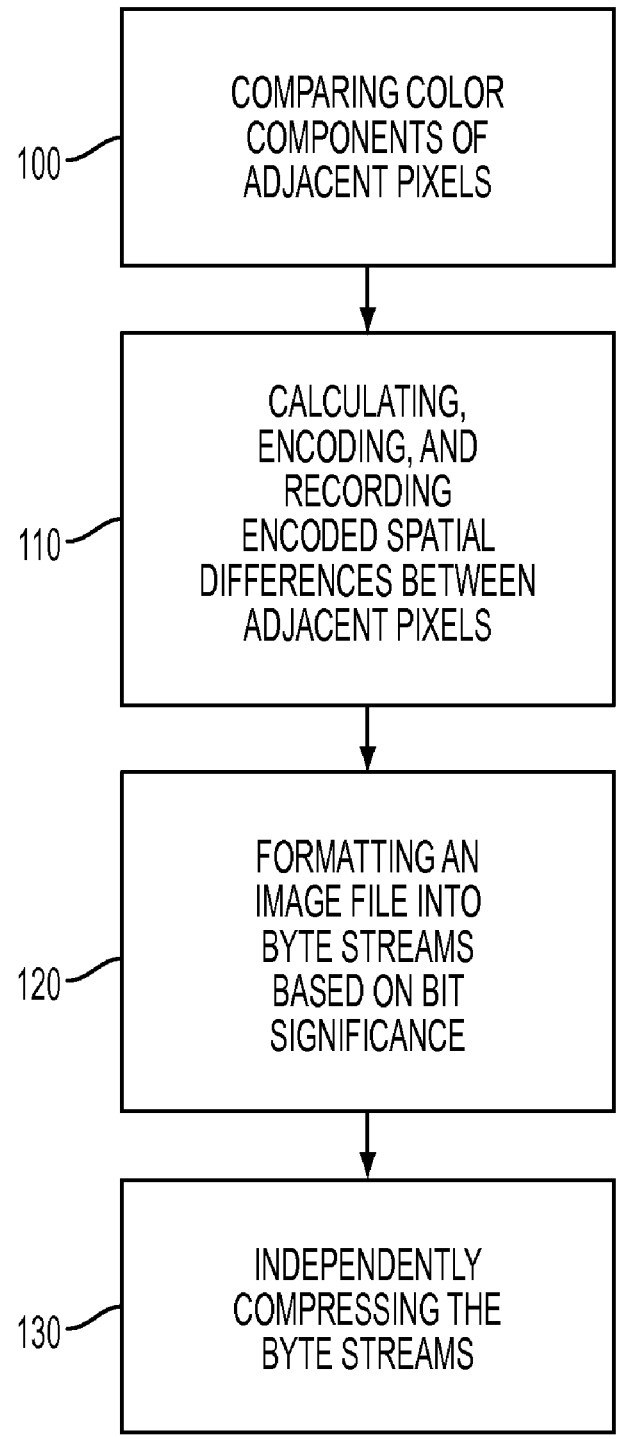
FIG. 2 is a flow chart illustrating an ALDC compression method for compressing color image data that can be implemented within embodiments of the present invention with reference to FIG. 1.

Turning now to the drawings in greater detail, it will be seen that FIG. 1 is a schematic diagram for explaining preprocessing of color image data, and FIG. 2 is a flow chart illustrating an ALDC compression method for compressing color image data that can be implemented within aspects of the present invention with reference to FIG. 1. The present invention is not limited to image data, and may be applied to voice, music or text data, or any other data that exhibits close spatial proximity.

Referring to FIGS. 1 and 2, color images are displayed by superimposing red, green, and blue (RGB) color planes or cyan, magenta, yellow and black (CMYK) color planes, for example. As shown in FIG. 1, the color image data, i.e., RGB image data having an intensity represented by 24 bits is separated by color planes, i.e., color components (red component, green component and blue component) via a demultiplexer 10, and the intensity of each pixel in each color plane represented by eight bits. Upon separation of the RGB image data, the data then goes through a CER (Compute differences, Encode differences and Rotate) process 15 which will be described with reference to operations 100 through 120 of the ALDC method shown in FIG. 2.

As shown in FIG. 2, an ALDC method for compressing color image data according to an exemplary embodiment of the present invention begins at operation 100, where same color components of the adjacent pixels (not shown) are compared to each other. That is, as shown in FIG. 1, the red component of one pixel is compared to the red component of an adjacent pixel, the green component of the pixel is compared to the green component of the adjacent pixel, and the blue component of the pixel is compared to the blue component of the adjacent pixel.

Figure 3:
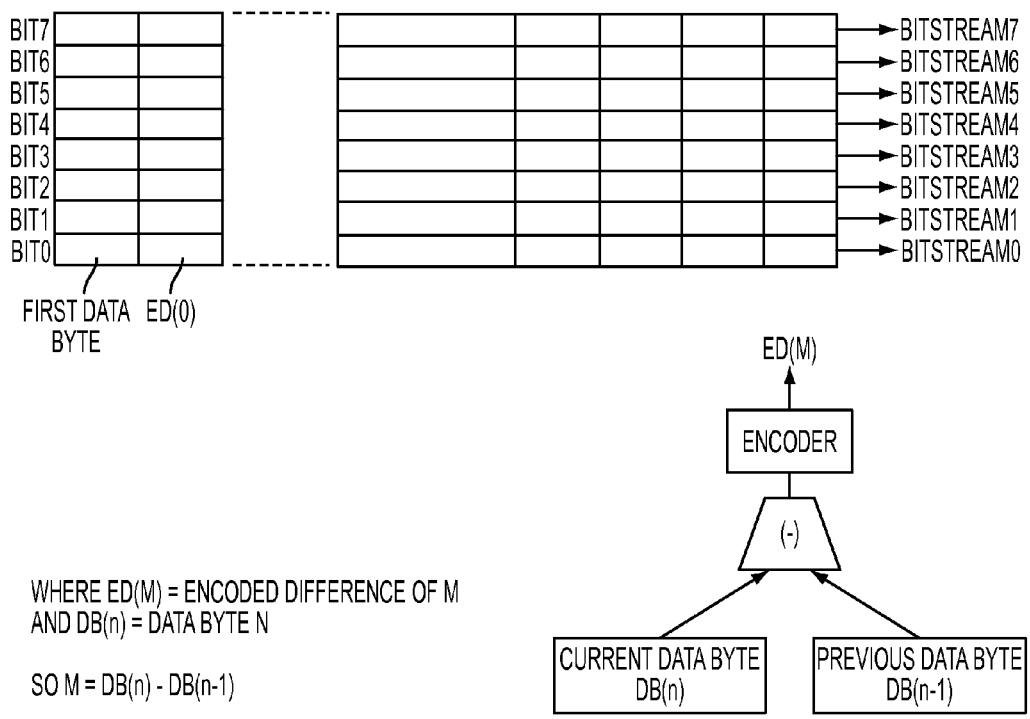
FIG. 3 is a diagram illustrating an operation of calculation, encoding, and rotation of spatial differences between adjacent pixels that can be implemented within embodiments of the present invention with reference to FIG. 2.

From operation 100, the process moves to operation 110, where spatial differences between the adjacent pixels are calculated, encoded and recorded (see FIG. 3, for example).

FIG. 3 is a diagram illustrating an operation of calculation, encoding and rotation of spatial differences between adjacent pixels that can be implemented within embodiments of the present invention with reference to FIG. 2. As shown in FIG. 3, the spatial difference is determined by first recording a first data byte as a reference data byte (DB0). Then, the spatial difference is determined by calculating the difference between a second data byte (DB1) and the first data byte (DB0). That is, the previous data byte is subtracted from the current data byte (DB (n)–DB (n-1)). These differences are then encoded to reduce entropy. The above process is repeated for all the data bytes. As shown in FIG. 3, M= DB(n)–DB(n-1), and ED(M)=encoded difference of M. For certain classes of images such as medical images, scenic images, photographs, adjacent pixels differ in RGB intensity or YCrCb (luma, chroma red, chroma blue) intensity only slightly. Thus, the spatial differences between these adjacent pixels would be minimal. When the differences between adjacent pixels are minimal, the most significant bits (MSB) of the data representing the encoded difference will be approximately zero. According to an exemplary embodiment, the calculating spatial differences between the plurality of adjacent pixels, encoding the spatial differences and recording the encoded spatial differences includes creating encoding arrays (to be discussed later with reference to FIG. 4) to be used for encoding the spatial differences calculated in operation 110. Further, the encoded spatial differences are rotated (i.e., bit slicing is performed).

Referring back to FIG. 2, from operation 110 of the ALDC method, the process moves to operation 120, where an image file representing the digital image is formatted into byte streams based on bit significance, for example, MSB stream, MSB-1 stream, . . . LSB stream, LSB-1 stream, etc.

According to an exemplary embodiment, the formation of an image file representing the digital image into byte streams based on bit significance includes re-partitioning into 8-byte streams via a multiplexer 20 as shown in FIG. 1. That is, by taking the difference data and reorganizing into byte streams based on bit significance, the data can be re-partitioned into 8-byte streams. The 8-byte streams for each component of the adjacent pixels are then combined by interleaving the 8-byte streams in order from the most significant byte (MSB) streams for each component of the adjacent pixels to the least significant byte (LSB) streams for each component of the adjacent pixels. For example, as shown in FIG. 1, the byte steams are interleaved as RedByteStream 7, GreenByteStream7, BlueByteStream7 . . . RedByteStream0, GreenByteStream0, and BlueByteStream0.

From operation 120 in FIG. 2, the process moves to operation 130 where the byte streams associated with each bit significance of the encoded spatial differences are independently compressed via a compression engine (not shown). According to an exemplary embodiment, specific image data information is included in the byte streams in order for the byte streams to be decoded. The specific image data information includes color plane information based on type of color image data (RGB or CMYK), image size (i.e., height and width) and image data (i.e., encoded data and encoded difference data for each color plane).

According to an exemplary embodiment, the most significant byte (MSB) streams will provide higher levels of compression while the less significant byte (LSB) streams will provide lower compression ratios. Thus, the ALDC method according to an exemplary embodiment of the present invention reduces the entropy of the original raw data while remaining lossless.

FIG. 4 is a chart illustrating encoding arrays that can be implemented within embodiments of the present invention. The use of two's complement arithmetic does not yield differences optimal for compression of image data. For example, 4−5=−1=1111 1111. Bit streams of differences encoded in two's complement format would compress very poorly. Further, signed-bit notation allows a range of −127 to 127 with the MSB being the sign bit, and this bit stream will also compress poorly. Therefore, according to an exemplary embodiment of the present invention, specific encoding is created which reserve smaller integers for relatively small differences and larger integers for larger differences. The specific encodings are used to encode the spatial differences such that entropy is forced to the LSB streams.

FIG. 4 illustrates some examples of encoding arrays 30 according to an exemplary embodiment of the present invention. The encoding arrays 30 are created to hold the specific encodings. Further, according to an exemplary embodiment, the encoding arrays 30 are stored as lookup tables (LUTs) and the predetermined number of LUTs corresponds to a size of the data to be compressed. In addition, according to one exemplary embodiment, the lookup tables are static. That is, the lookup tables are predetermined and fixed. Alternatively, according to another exemplary embodiment, the LUTs may be adaptive based on the data during processing of the data.

The LUTs are used as an alternative to signed-bit notation, so that subtracting two 8-bit values will yield an 8-bit result, and for small differences, MSBs of the result includes largely zeros. For an 8-bit encoding, 2^8 or 256 arrays are created corresponding to each possible pixel value. The pattern shown continues until the value to be stored in the array is less than zero or greater than 255. Referring to FIG. 4, to determine the encoded difference between two operands (A and B, for example) the LUT for A is searched until B is found. The Index is then used as the encoded difference (ED). According to an exemplary embodiment, placement of the operands within the LUT is such that the operands closest to A have smaller indexes while those operands farther away have higher indexes and the Index 0 includes A. For example, as shown in FIG. 4, to find the encoded difference between 5 and 4, an encoding array for 5 would be searched for an entry which is equal to 4. The index within this array corresponding to 4 is the encoded difference. The present invention is not limited to alternative LUT implementations, such as storing the encoded differences within the LUT in which the indexes would then be the operands.

According to an exemplary embodiment, the encoding arrays correspond to the type of data to be compressed.

Therefore, the present invention provides a method for compressing raw image data within an ALDC encoded data stream by first reducing the entropy of the image data prior to compression of the data, thereby resulting in a higher compression ratio.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

Figure 5:
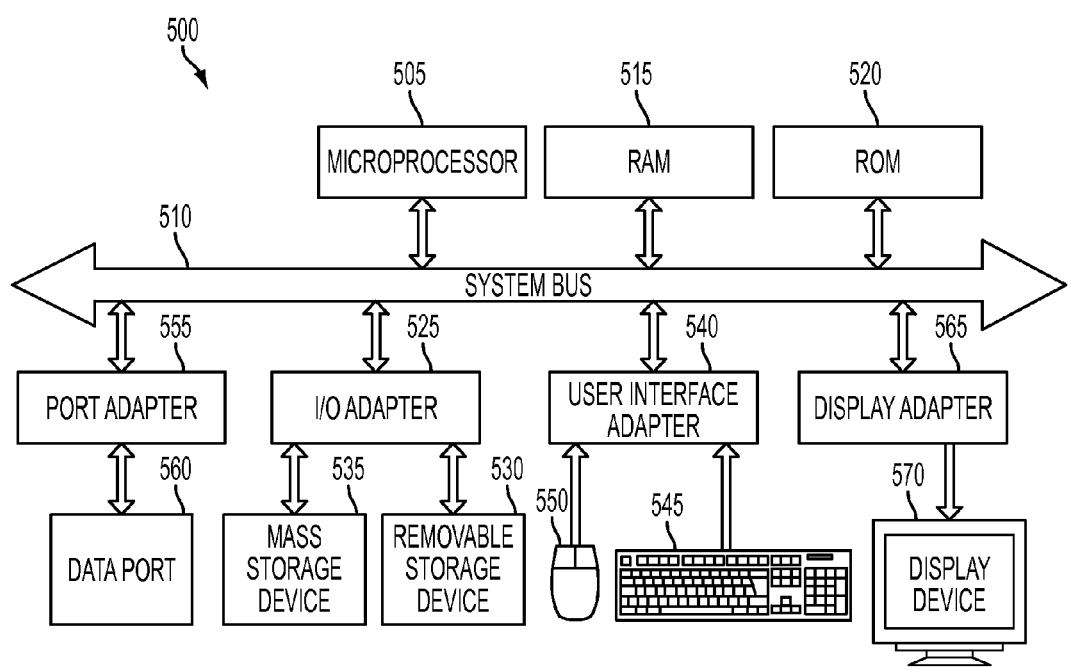
FIG. 5 is a schematic block diagram of a general-purpose computer suitable for practicing the present invention embodiments.

Generally, the ALDC method for compressing color image data described herein is practiced with a general-purpose computer and the method may be coded as a set of instructions on removable or hard media for use by the general-purpose computer. FIG. 5 is a schematic block diagram of a general-purpose computer suitable for practicing the present invention embodiments. In FIG. 5, computer system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for a connecting a removable data and/or program storage device 530 and a mass data and/or program storage device 535, a user interface adapter 540 for connecting a keyboard 545 and a mouse 550, a port adapter 555 for connecting a data port 560 and a display adapter 565 for connecting a display device 570.

ROM 520 contains the basic operating system for computer system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage device 535 include hard disk drives and non-volatile memory such as flash memory. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 530, fed through data port 560 or typed in using keyboard 545.

In view of the above, the present method embodiment may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An adaptive lossless data compression method for compression of color image data in a data processing system, the method comprising:
   comparing a plurality of adjacent pixels in a digital image by separating a plurality of components for each of the adjacent pixels and comparing a same component of each of the adjacent pixels;
   calculating spatial differences between the plurality of adjacent pixels, encoding the spatial differences, and recording the encoded spatial differences by creating encoding arrays and encoding the spatial differences using the encoding arrays, wherein the encoding arrays correspond to a type of data to be compressed, and wherein the encoding arrays are stored in lookup tables, with a predetermined number of lookup tables corresponding to a size of the data to be compressed;
   formatting an image file representing the digital image into byte streams based on bit significance; and
   compressing, independently, the byte streams associated with each bit significance of the encoded spatial differences.

2. The method of claim 1, wherein the lookup tables are static.

3. The method of claim 1, wherein the lookup tables are adaptive based on the data during processing of the data.

4. The method of claim 1, wherein calculating spatial differences between the plurality of adjacent pixels, encoding the spatial differences, and recording the encoded spatial differences, further comprises:
   rotating the encoded spatial differences.

5. The method of claim 4, wherein formatting an image file representing the digital image into byte streams based on bit significance, comprises:
   re-partitioning resultant data of the encoded spatial differences into 8-byte streams; and
   combining the 8-byte streams for each component of the adjacent pixels.

6. The method of claim 5, wherein combining the 8-byte streams for each component of the adjacent pixels comprises:
   interleaving the 8-byte streams in order from most significant byte streams for each component of the adjacent pixels to least significant byte streams for each component of the adjacent pixels.

7. A computer program product comprising a computer readable non-transitory medium storing a computer readable program, wherein the computer readable program when executed on a computer causes the computer to implement an adaptive lossless data compression method for compression of color image data in a data processing system, the method comprising:
   comparing a plurality of adjacent pixels in a digital image by separating a plurality of components for each of the adjacent pixels and comparing a same component of each of the adjacent pixels;
   calculating spatial differences between the plurality of adjacent pixels, encoding the spatial differences and recording the encoded spatial differences by creating encoding arrays and encoding the spatial differences using the encoding arrays, wherein the encoding arrays correspond to a type of data to be compressed, and wherein the encoding arrays are stored in lookup tables, with a predetermined number of lookup tables corresponding to a size of the data to be compressed;

formatting an image file representing the digital image into byte streams based on bit significance; and compressing, independently, the byte streams associated with each bit significance of the encoded spatial differences.

8. The computer program product of claim 7, wherein the lookup tables are static.

9. The computer program product of claim 7, wherein the lookup tables are adaptive based on the data during processing of the data.

10. The computer program product of claim 7, wherein calculating spatial differences between the plurality of adjacent pixels, encoding the spatial differences and recording the encoded spatial differences, further comprises:

rotating the encoded spatial differences.

11. The computer program product of claim 10, wherein formatting an image file representing the digital image into byte streams based on bit significance, comprises:

re-partitioning resultant data of the encoded spatial differences into 8-byte streams; and combining the 8-byte streams for each component of the adjacent pixels.

12. The computer program product of claim 11, wherein combining the 8-byte streams for each component of the adjacent pixels comprises:

interleaving the 8-byte streams in order from most significant byte streams for each component of the adjacent pixels to least significant byte streams for each component of the adjacent pixels.

* * * * *